United States Patent
Thibault et al.

(10) Patent No.: US 7,523,812 B2
(45) Date of Patent: Apr. 28, 2009

(54) METHOD OF MANAGING AN ELECTROMECHANICAL BRAKE ACTUATOR IN PARTICULAR FOR AIRCRAFT

(75) Inventors: Julien Thibault, Palaiseau (FR); Florent Nierlich, Courbevoie (FR)

(73) Assignee: Messier-Bugatti, Velizy Fillacoublay (FR)

( * ) Notice: Subject to any disclaimer, the term of this patent is extended or adjusted under 35 U.S.C. 154(b) by 214 days.

(21) Appl. No.: 11/429,207

(22) Filed: May 8, 2006

(65) Prior Publication Data

US 2007/0084677 A1   Apr. 19, 2007

(30) Foreign Application Priority Data

Sep. 2, 2005  (FR) ................... 05 08994

(51) Int. Cl.
*B60T 13/74* (2006.01)
(52) U.S. Cl. ........................ 188/71.5; 303/3
(58) Field of Classification Search ........... 188/1.11 E, 188/1.11 L, 71.5, 158–164; 318/332, 449, 318/461, 599; 303/3
See application file for complete search history.

(56) References Cited

U.S. PATENT DOCUMENTS

| | | | | |
|---|---|---|---|---|
| 4,516,059 A * | 5/1985 | Roberts et al. | ............... | 388/847 |
| 4,659,976 A * | 4/1987 | Johanson | ................... | 388/816 |
| 4,689,543 A * | 8/1987 | Hucker | ....................... | 318/798 |
| 5,019,756 A * | 5/1991 | Schwarz | ................ | 318/400.21 |
| 5,504,404 A * | 4/1996 | Tamaki et al. | ................ | 318/432 |
| 5,923,728 A * | 7/1999 | Ikkai et al. | .................... | 318/807 |
| 6,550,871 B1 * | 4/2003 | Bohm et al. | .................. | 303/20 |
| 6,702,069 B2 * | 3/2004 | Ralea et al. | ................ | 188/71.5 |
| 6,822,417 B2 * | 11/2004 | Kawaji et al. | ................ | 318/701 |
| 6,825,632 B2 * | 11/2004 | Hahn et al. | .................. | 318/599 |
| 2003/0044172 A1 * | 3/2003 | Osselmann et al. | ......... | 388/800 |
| 2005/0039990 A1 | 2/2005 | Girod et al. | | |
| 2008/0042605 A1 * | 2/2008 | Subrata et al. | .............. | 318/449 |

* cited by examiner

*Primary Examiner*—Christopher P Schwartz
(74) *Attorney, Agent, or Firm*—Sughrue Mion, PLLC

(57) ABSTRACT

The invention relates to a method of managing an electromechanical brake actuator comprising an electric motor adapted to move a pusher against a stack of disks to apply a braking force to the stack of disks, selectively, the method comprising the step of causing the actuator to operate in a given operating domain in the current/speed plane in such a manner that the operating domain is selected to present a boundary having a portion that extends substantially along a constant power curve plotted in the current/speed plane.

6 Claims, 3 Drawing Sheets

METHOD OF MANAGING AN ELECTROMECHANICAL BRAKE ACTUATOR IN PARTICULAR FOR AIRCRAFT

The present invention relates to a method of managing an electromechanical brake actuator, in particular for aircraft.

BACKGROUND OF THE INVENTION

Methods are known for managing an electromechanical brake actuator that comprises an electric motor adapted to move a pusher facing a stack of disks in order to apply a braking force selectively to the stack of disks.

As an example of such a brake, FIG. 1 is a section view of an electromechanical brake 3 for an aircraft that is mounted on an axle 2 of an undercarriage of the aircraft and that carries a wheel rim 1 (for receiving a tire that is not shown). Such a brake 3 comprises a torsion tube 4 secured to the axle 2 and a stack of disks 5 extending between the torsion tube 4 and the wheel rim 1. The stack of disks 5 comprises first disks (referred to as "rotor" disks) constrained to rotate with the rim 1, and second disks (referred to as "stator" disks) disposed in alternation with the first disk and constrained in rotation with the torsion tube 4, such that they do not rotate with the rim. Facing the stack of disks there is a ring 6 secured to the torsion tube 4 and carrying electromechanical actuators 7, each comprising an electric motor (not shown) adapted to move a pusher 8 facing the stack of disks 5 in order to apply a braking force thereto in selective manner.

As shown in FIG. 2, which is a graph plotting the operating range or domain of the electric motor of one of the actuators 7 in the current/speed plane, said operating domain D includes in conventional manner a boundary defined firstly by a first straight line 10 (sloping downwards) at a gradient that depends on the characteristics and the dimensions of the motor, and at a height that is determined by the power supply voltage selected for the motor, and secondly a second straight line 11 (a vertical line) defined by a maximum current that should not be exceeded while the motor is in operation, in particular for the purpose of protecting the power components associated with the motor.

Typical operating points for brake actuators lie firstly in the vicinity of the intersection of the speed axis and the first straight line 10, such as the operating point 12, corresponding to a stage during which the pusher 8 is approaching the disks 5 at high speed, and secondly in the vicinity of the intersection between the current axis and the second straight line 11, such as operating point 13, corresponding to a state in which the pusher 8 is applying a force against the disks 5.

In general, on aircraft, the power available is limited and it is important to ensure that the actuators cannot draw power greater than the maximum authorized power $p_{max}$ in order to avoid triggering the aircraft's electrical protection devices of the circuit breaker type.

This constraint thus leads to an operating domain D being defined which, in the current/speed plane, extends entirely beneath the constant power curve 14 corresponding to the maximum authorized power $P_{max}$.

This limitation leads to the performance of the actuator being under-utilized.

OBJECT OF THE INVENTION

An object of the invention is to provide a management method that enables the performance of electromechanical brake actuators to be increased while ensuring that the power drawn does not exceed the maximum authorized power.

BRIEF DESCRIPTION OF THE INVENTION

To achieve this object, the invention provides a method of managing an electromechanical brake actuator that comprises an electric motor adapted to move a pusher facing a stack of disks in order to apply a braking force selectively against the stack of disks, the method comprising the step of causing the electric motor to operate in a given operating domain in the current/speed plane, the operating domain being selected, according to the invention, so as to present a boundary having a portion that extends substantially along a constant power curve plotted in the current/speed plane.

By selecting as the constant power curve, a curve that corresponds to the maximum authorized power $p_{max}$ (or to a power that is slightly lower), the domain as defined in this way enables the motor to be operated at operating points corresponding to speeds or currents that are higher than in the prior art, while ensuring that the motor does not draw power greater than the maximum authorized power.

BRIEF DESCRIPTION OF THE DRAWINGS

The invention can be better understood in the light of the following description given with reference to the figures of the accompanying drawings in which, in addition to FIGS. 1 and 2 described above.

DETAILED DESCRIPTION OF THE INVENTION

Figure 1:
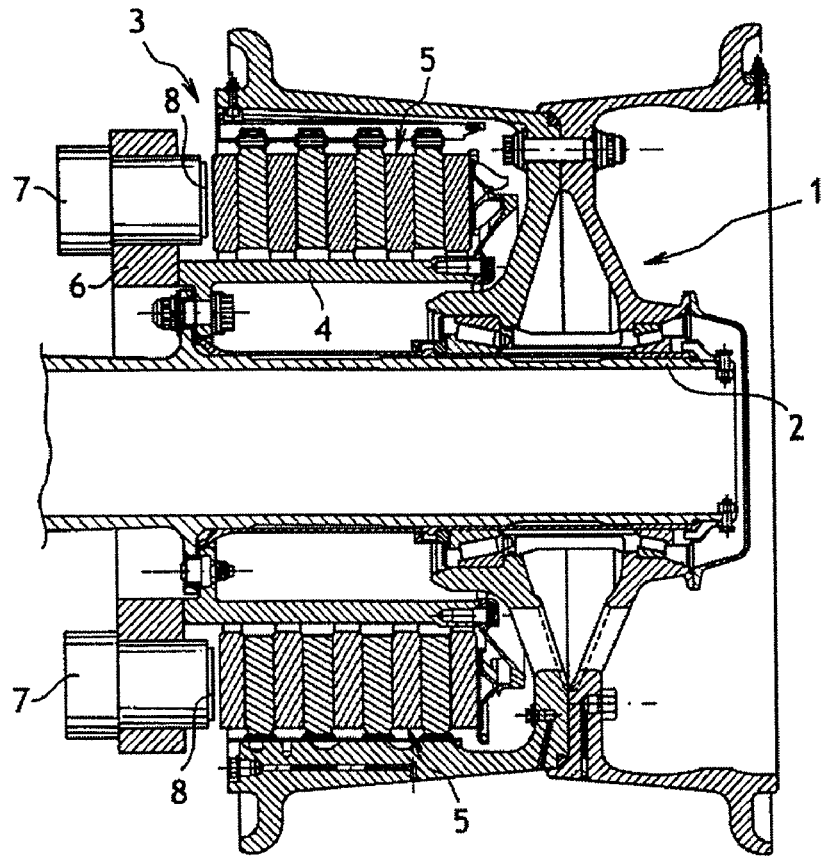
Figure 2:
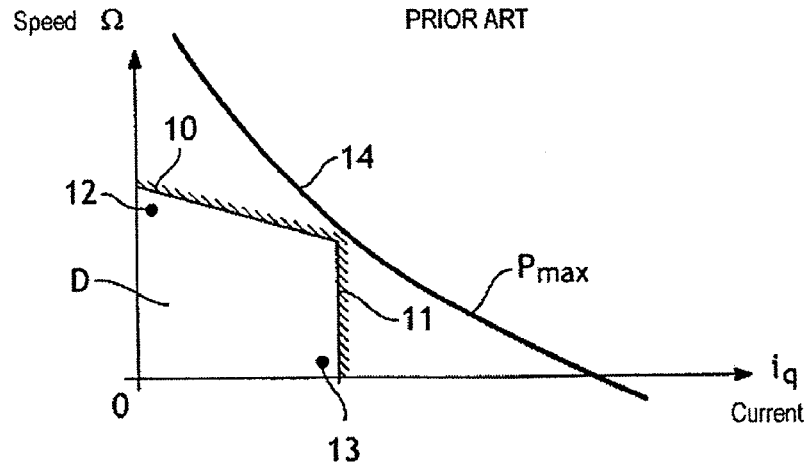
Figure 3:
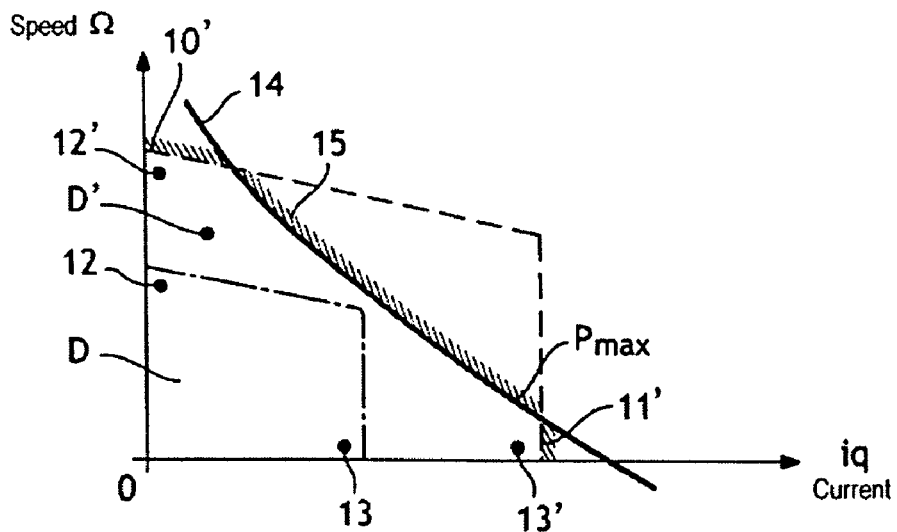
FIG. 3 is a figure analogous to FIG. 2 showing an implementation of the invention.

With reference to FIG. 3, the invention consists in causing the electromechanical actuator 7 to operate in an operating domain D' that is greater than the domain D (plotted in chain-dotted lines). The domain D' is defined by a first straight line 10' corresponding to the motor being fed at a voltage that is greater than that defining the first straight line 10 of FIG. 2, and a second straight line 11' corresponding to a maximum current that is greater than that defined by the second straight line 11 of FIG. 2. Furthermore, and according to the invention, the domain D' is also defined by a boundary portion 15 that extends along a constant power curve 14 corresponding to the power $p_{max}$ (also visible in FIG. 2).

The new operating domain D' enables the actuator 7 to operate at operating points that enable greater performance to be obtained. Thus, the actuator 7 can operate at operating point 12', i.e. at a speed that is greater than the speed associated with the operating point 12, or it can operate at an operating point 13', i.e. at torque that is greater than the torque associated with the point 13. Nevertheless, the domain D' remains entirely beneath the constant power curve 14 corresponding to $p_{max}$, such that operating the actuator in the operating domain D' restricts the power drawn by the actuator 7 to power that is no greater than the maximum power $p_{max}$.

With the principle of the invention set out above, there follows a detailed description of a particular implementation of the invention.

Figure 4:
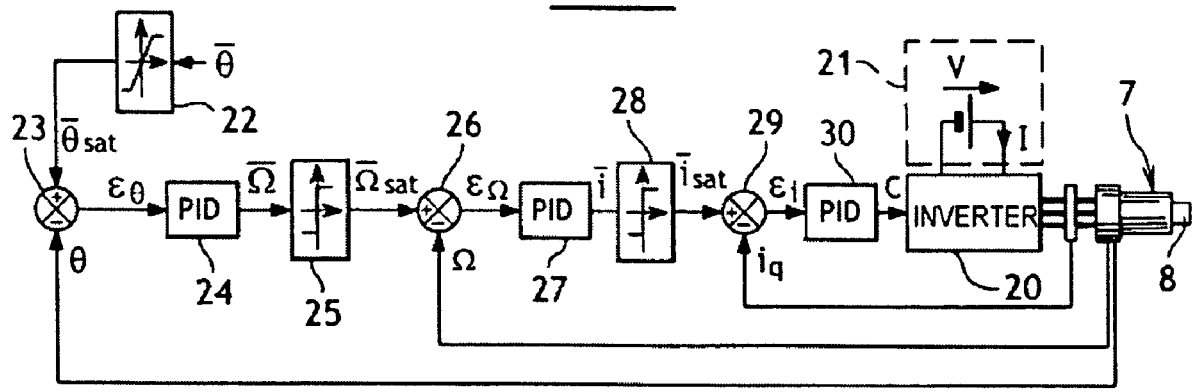
FIG. 4 is a block diagram showing the servo-control of the electric motor of one of the actuators in a particular implementation of the invention including position saturation, speed saturation, and current saturation.

With reference to FIG. 4, the electromechanical actuator 7 is powered in conventional manner by an inverter 20 which generates three phases of alternating current (AC) for three phases of the electric motor fitted to the actuator 7. The inverter 20 is powered by an electricity source 21 adapted to deliver current I at a voltage V that is substantially constant, and the inverter is servo-controlled on the basis of a reference angular position $\bar{\theta}$ for the motor (corresponding to a position of the pusher facing the stack of disks), by generating a control signal c for the inverter such that the electric motor of the actuator 7 is caused to reach an angular position corresponding to the reference angular position $\bar{\theta}$.

The servo-control described herein includes a position loop, a speed loop, and a current loop that are interleaved one within another.

The reference angular position $\bar{\theta}$ generated by a braking computer (not shown) is initially applied to a position saturation circuit 22 (described in greater detail below with reference to FIG. 10) arranged to limit the maximum slope of the reference angular position $\bar{\theta}$ (i.e. the maximum variation in the reference angular position $\bar{\theta}$ as a function of time) to a determined maximum value. This saturation filters out sudden rises in the reference angular position that would require operation at high power.

The output $\bar{\theta}_{sat}$ from the position saturation circuit 22 forms the positive input of a summing circuit 23 whose negative input is formed by a measurement $\theta$ of the angular position of the motor of the actuator 7, thus forming the position loop.

The output from the summing circuit 23, i.e. the error $\epsilon_\theta = \bar{\theta}_{sat} - \theta$ forms the input to a first proportional integral derivative (PID) controller 24 whose output gives a reference speed of rotation $\bar{\Omega}$ for the motor (which is also directly proportional to a reference displacement speed of the pusher). The reference speed $\bar{\Omega}$ is subjected to a speed saturation circuit 25 (described in detail below with reference to FIG. 5) arranged to limit the reference speed $\bar{\Omega}$ so that the operating point of the actuator does not leave the domain D'. The output $\bar{\Omega}_{sat}$ from the speed saturation circuit 25 forms the positive input of a summing circuit 26 whose negative input is formed by a measurement $\Omega$ of the speed of rotation of the motor of the actuator 7, thus forming the speed loop.

The output from the summing circuit 26, i.e. the error $\epsilon_\Omega = \bar{\Omega}_{sat} - \Omega$ forms the input to a second PID controller 27 whose output constitutes a reference current $\bar{i}$. The reference current $\bar{i}$ is subjected to a current saturation circuit 28 (described in detail below with reference to FIG. 6) that is arranged to limit the reference current $\bar{i}$ so that the operating point of the actuator does not leave the domain D'. The output $\bar{i}_{sat}$ from the current saturation circuit 28 forms the positive input of a summing circuit 29 whose negative input is formed by a measurement $i_q$ of the current delivered by the inverter 20 to the motor of the actuator 7, thus forming the current loop. The value $i_q$ is estimated in conventional manner from the instantaneous amplitudes of the three current phases generated by the inverter 20.

Finally, the output from the summing circuit 29, i.e. the error $\epsilon_i = \bar{i}_{sat} - i_q$, forms the input to a third PID controller 30 whose output is the control signal c.

Figure 5:
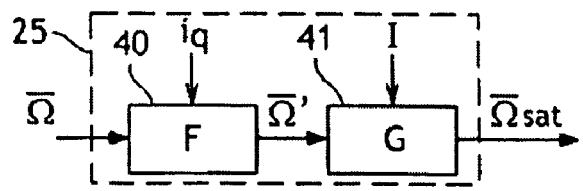
FIG. 5 is a view showing a detail of the block diagram of FIG. 4, showing speed saturation.

With reference to FIG. 5, the speed saturation circuit 25 comprises firstly a first limiter 40 that limits the reference speed $\bar{\Omega}$ so that the operating point $(\bar{\Omega}, i_q)$ corresponding to the reference speed remains within the operating domain D'. A threshold F is defined that depends on the current $i_q$, as follows: the power consumed by the motor of the actuator 7 subject to a current $i_q$ and rotating at the speed $\Omega$ is expressed as follows:

$$P = k_1 \cdot \Omega \cdot i_q + k_2 \cdot i_q^2$$

where the first term represents the mechanical power developed by the motor of the actuator and the second term represents losses due to the Joule effect. The constant power current curve 14 thus has the following equation:

$$P_{max} = k_1 \cdot \Omega \cdot i_q + k_2 \cdot i_q^2$$

where $P_{max}$ is a parameter that is set a priori.

For a given current $i_q$, it suffices to limit the reference speed $\bar{\Omega}$ to the threshold F that is selected as follows:

$$F = \frac{P_{max} - k_2 \cdot i_q^2}{k_1 \cdot i_q}$$

for $i_q \leq \sqrt{P_{max}/k_2}$, and otherwise 0.

Figure 7:
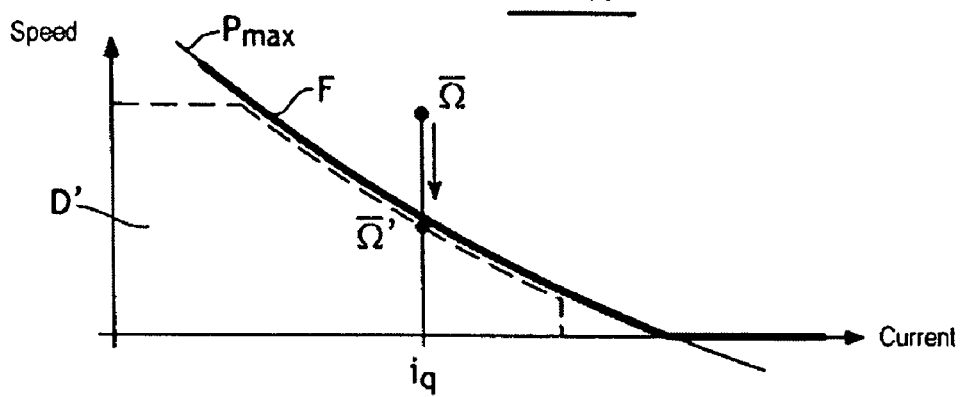
FIG. 7 is a graph showing variations in a threshold involved in the saturations shown in FIGS. 5 and 10.

The threshold F is plotted in FIG. 7. The threshold F follows the constant power curve $P_{max}$ to the point where it intersects the abscissa axis, and then it keeps the value zero. In FIG. 7, there can be seen the effect of the first limiter 40 which, for a given current $i_q$, brings the reference speed $\bar{\Omega}$ to the value $\bar{\Omega}$, taken on the threshold curve F that coincides with the boundary 15 of the domain D' (plotted in dashed lines in FIG. 7), such that the operating point is brought into the domain D'.

However, in operation, it can happen that the parameters used for determining the threshold F (essentially the torque constant $k_1$ and the electrical resistance value $k_2$) vary for various reasons (wear, heating, . . . ). As a result, although the limiter 40 is operating correctly, the power can accidentally exceed the power $p_{max}$.

Figure 8:
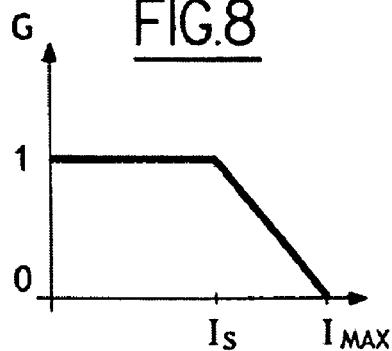
FIG. 8 is a graph showing variations in a coefficient involved in the saturations shown in FIGS. 5, 6, and 10.

To prevent such excesses, the speed saturation circuit 25 includes a safety limiter 41 that applies a coefficient G to the output $\bar{\Omega}'$ from the first limiter 40, which coefficient G depends on the power supply current I fed to the inverter 20, as follows: the power consumed by the inverter 20 is $P = V \cdot I$. Since the power supply voltage V is substantially constant, the power consumed by the inverter 20 thus varies substantially with the power supply current I. The power $p_{max}$ thus corresponds to a current $I_{max}$ such that $p_{max} = V \cdot I_{max}$. Under such circumstances, the coefficient G is then selected, as shown in FIG. 8, in such a manner as to be equal to 1 so long as the power supply current I is less than a threshold current $I_s$ (e.g. 90% of the current $I_{max}$), and then decreases linearly towards 0 when the power supply current I reaches the current $I_{max}$.

The output from the speed saturation circuit 25 is thus equal to $\bar{\Omega}_{sat} = G \cdot \bar{\Omega}'$. Thus, if the power supply current I of the inverter 20 approaches the current $I_{max}$, the reference speed is subjected to a coefficient that tends towards 0 so that the pusher slows down and the power drawn decreases, thus causing the power supply current I to move away from the current $I_{max}$. Thus, the power consumed can never exceed the maximum power $P_{max}$.

Figure 6:
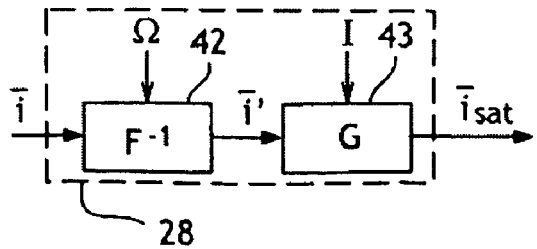
FIG. 6 is a view showing a detail of the block diagram of FIG. 4, showing current saturation.
Figure 9:
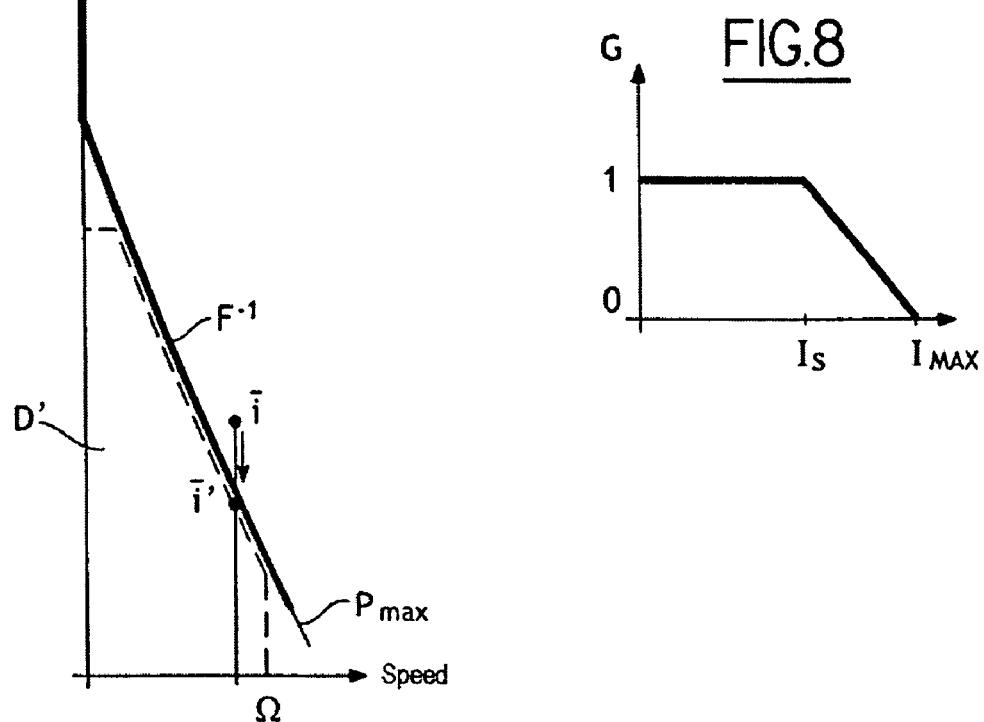
FIG. 9 is a graph showing variations in a coefficient involved in the saturation shown in FIG. 6.

With reference to FIG. 6, the current saturation circuit 28 comprises a first limiter 42 which limits the reference current $\overline{i}$ to a threshold $F^{-1}$ that depends on the speed $\Omega$ and that is shown in FIG. 9, said threshold being selected in this example as being the reciprocal of the threshold F used for the first limiter 40 of the speed saturation circuit 25 (graphically, the threshold $F^{-1}$ can be seen to be the same as the threshold F of FIG. 7, by mentally interchanging the abscissa axis and the ordinate axis).

FIG. 9 shows the effect of saturation which, for a given speed $\Omega$, brings the reference current $\overline{i}$ to the value $\overline{i}'$ lying on the threshold curve $F^{-1}$ and coinciding with the boundary 15 of the operating domain D' (plotted as a dashed line in FIG. 9), such that the operating point $(\Omega, \overline{i})$ is brought into the domain D'.

The saturation circuit 28 also includes a safety limiter 43 that is entirely identical to the safety limiter 41 of the speed saturation circuit 25.

Figure 10:
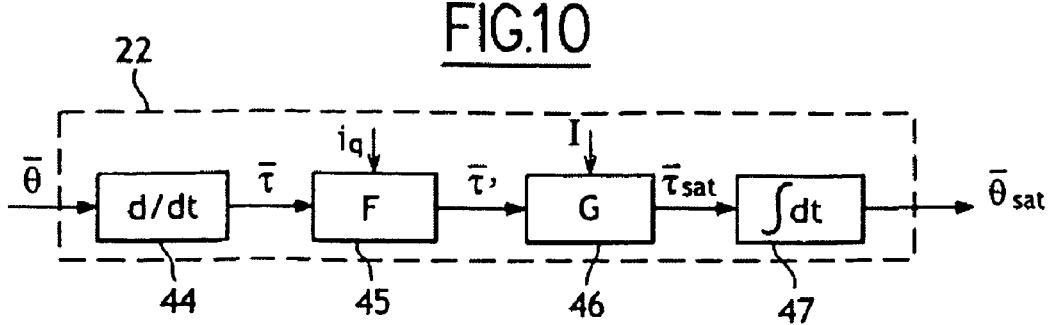
FIG. 10 is a view showing a detail of the block diagram of FIG. 4, showing position saturation.

Finally, with reference to FIG. 10, the position saturation circuit 23 comprises firstly a differentiator 44 that estimates a time derivative $\overline{\tau}$ of the reference position $\overline{\theta}$. The time derivative $\overline{\tau}$ (which has the dimensions of angular velocity) is then applied to a first limiter 45 that is entirely identical to the first limiter 40 of the saturation circuit 25, thus making use of the threshold F and outputting a value $\overline{\tau}'$. This value is subjected to a safety limiter 46 that is entirely identical to the safety limiters 41 and 43 so as to obtain a saturated time derivative $\overline{\tau}_{sat}$ which is processed by a time integrator 47 in order to provide the reference saturated position $\overline{\Omega}_{sat}$, with the operating point $(\overline{\tau}_{sat}, i_q)$ then being in the operating domain D'.

The invention is not limited to the above description, but on the contrary covers any variant coming within the ambit defined by the claims.

In particular, although the operation of the actuator and the implementation of the invention are described in the first quadrant of the current/speed plane, it is clear that the invention could be extended to the other three quadrants of said plane. Thus, each quadrant then presents a portion of boundary that lies substantially on a constant power curve.

Although the servo-control illustrated makes use of position saturation, speed saturation, and current saturation, it would be possible to make do with only two of these saturations, or even with only one. All of them serve to keep the operating point of the actuator within the domain D'. Naturally, the larger the number of saturations that are implemented, the smaller the risk of the operating point crossing the boundary of the domain D'. Nevertheless, increasing the number of saturations contributes to destabilizing servo-control since each saturation introduces delay into the servo-control loop. Thus, the number of saturations used depends on a compromise between reducing the risk of the operating point leaving the operating domain D' and ensuring that servo-control is stable.

Although the saturation circuits shown comprise a respective first limiter having its threshold determined by means of continuous functions of current or of measured speed, giving the operating domain a function that fits exactly against the shape of a constant power curve in the current/speed plane, it is also possible to construct a boundary that does not fit a constant power curve exactly, for example that presents a staircase-shape.

The saturation circuits need not have safety limiters, if there is no danger of power transients accidentally going beyond the maximum authorized power. In this respect, one technique for reducing the risk of such excesses consists in providing the operating domain of the actuator with a boundary that does not extend along the constant power curve that corresponds to the maximum authorized power $P_{max}$, but instead that extends along a constant power curve that corresponds to some slightly smaller power value $\alpha \cdot P_{max}$, where $\alpha$ is less than 1 (e.g. 90%).

Although the description relates to position servo-control for the actuator, the invention is equally applicable to force servo-control.

What is claimed is:

1. A method of managing an electromechanical brake actuator comprising an electric motor adapted to move a pusher facing a stack of disks to selectively apply a braking force to the stack of disks, the electric motor running at a speed of rotation under a given current, the method including causing the actuator to operate at an operating point defined by the speed of rotation of the motor and its current, where the operating point lies within a given operating domain defined in a current/speed plane;

wherein the operating domain is selected to present a boundary that has a portion that extends substantially along a constant power curve plotted in the current/speed plane.

2. A method according to claim 1, in which servo-control is used that includes a current loop receiving a current reference, the method including the step of saturating the current reference in such a manner that the operating point corresponding to the saturated current reference and to the speed of rotation remains within said operating domain.

3. A method according to claim 2, in which the actuator is powered by an electricity source delivering a power, and in which the reference is multiplied by a coefficient G that is zero if the power is equal to or greater than the maximum authorized power.

4. A method according to claim 3, in which the electricity source is arranged to deliver a power supply current at substantially constant voltage, and in which the power supply current is measured and compared with a maximum current corresponding to the maximum authorized power.

5. A method according to claim 1, in which servo-control is implemented including a speed loop receiving a speed reference, the method including the step of saturating the speed reference so that the operating point corresponding to the saturated speed reference and to the current remains within said operating domain.

6. A method according to claim 1, in which servo-control is implemented including a position loop receiving a position reference, the method including the step of saturating the position reference so that the operating point corresponding to the derivative of the saturated position reference and to the current remains within said operating domain.

* * * * *